United States Patent
Wong et al.

(10) Patent No.: US 9,418,455 B1
(45) Date of Patent: Aug. 16, 2016

(54) GRAPHING PARAMETERS OF A VIRTUALIZED COMPUTING ENVIRONMENT

(71) Applicant: VMware, Inc., Palo Alto, CA (US)

(72) Inventors: Karen Natalie Wong, San Carlos, CA (US); David Yang, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 365 days.

(21) Appl. No.: 13/861,694

(22) Filed: Apr. 12, 2013

(51) Int. Cl.
*G06T 11/20* (2006.01)

(52) U.S. Cl.
CPC .................................... *G06T 11/206* (2013.01)

(58) Field of Classification Search
CPC ... G06T 11/206; G06F 3/0481; G06F 17/246; G06F 3/04845; H04L 12/2458; G06Q 10/10; G06Q 30/06; G06Q 40/04; G09G 5/222
See application file for complete search history.

(56) References Cited

U.S. PATENT DOCUMENTS

| | | | |
|---|---|---|---|
| 7,421,660 B2 | 9/2008 | Charnock et al. | |
| 8,224,942 B1 * | 7/2012 | Presotto et al. | 709/223 |
| 2009/0085917 A1 | 4/2009 | Fuller et al. | |
| 2011/0261055 A1 * | 10/2011 | Wong et al. | 345/440 |
| 2012/0023429 A1 | 1/2012 | Medhi et al. | |
| 2012/0209940 A1 * | 8/2012 | Kidambi et al. | 709/212 |
| 2012/0284713 A1 * | 11/2012 | Ostermeyer et al. | 718/1 |
| 2012/0311475 A1 * | 12/2012 | Wong | 715/772 |
| 2013/0050246 A1 * | 2/2013 | Barry et al. | 345/593 |
| 2013/0173351 A1 | 7/2013 | Livne et al. | |
| 2013/0227338 A1 * | 8/2013 | Lingafelt et al. | 714/4.5 |
| 2013/0235416 A1 * | 9/2013 | Moore et al. | 358/1.15 |

* cited by examiner

*Primary Examiner* — Todd Buttram

(57) ABSTRACT

A computer-implemented method for generating a graph of parameters of a virtualized computing environment. The method includes accessing parameters from virtual machine groupings, generating a first graph depicting overall allocation of resources and overall current usage of resources for the virtual data centers, generating a second graph depicting aggregate health of the virtual machine groupings, and generating a third graph depicting allocation of resources of the virtual data centers overlaid with the current usage of resources of the virtual data centers, wherein the first graph, the second graph and the third graph are for display in a single view.

18 Claims, 18 Drawing Sheets

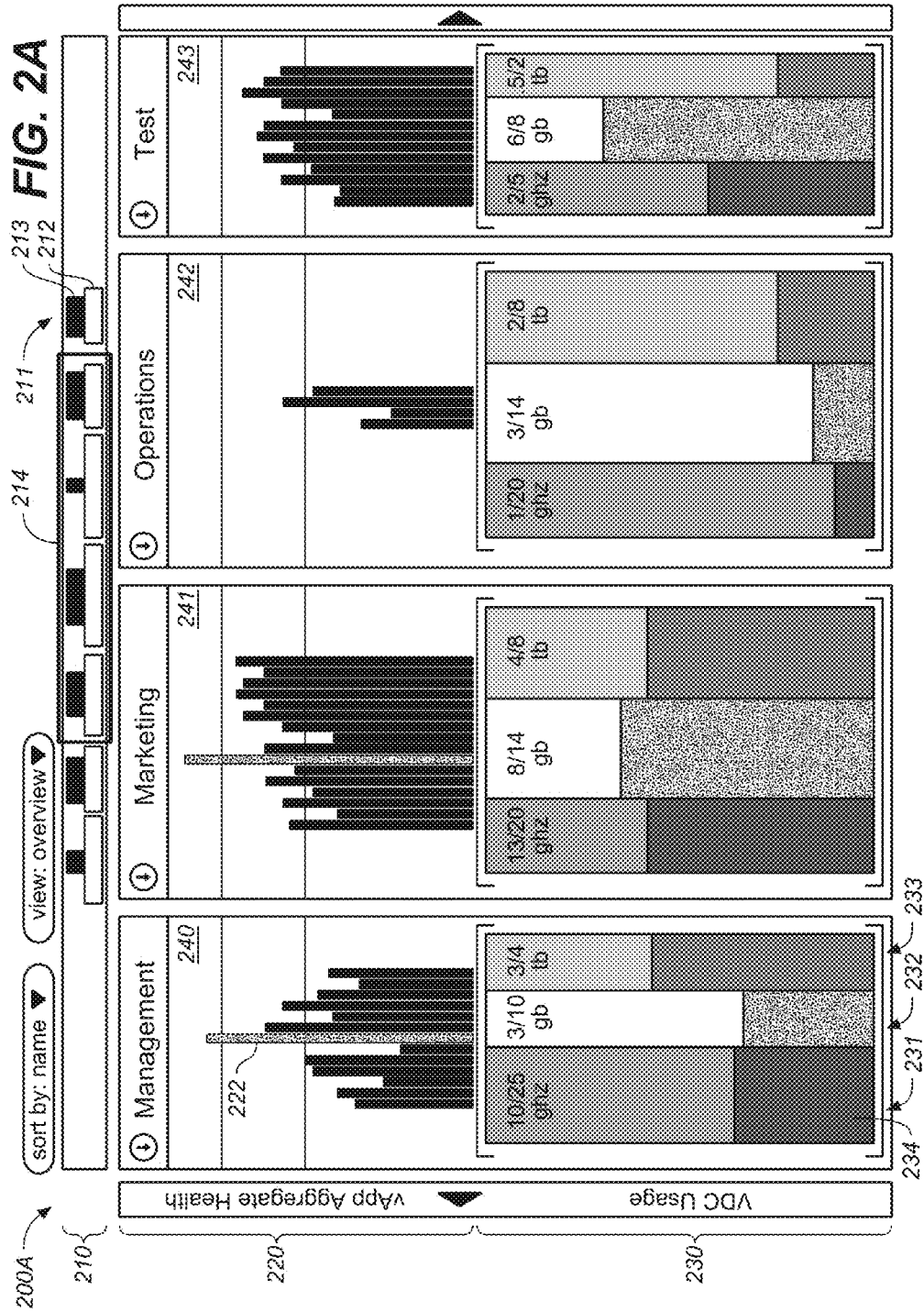

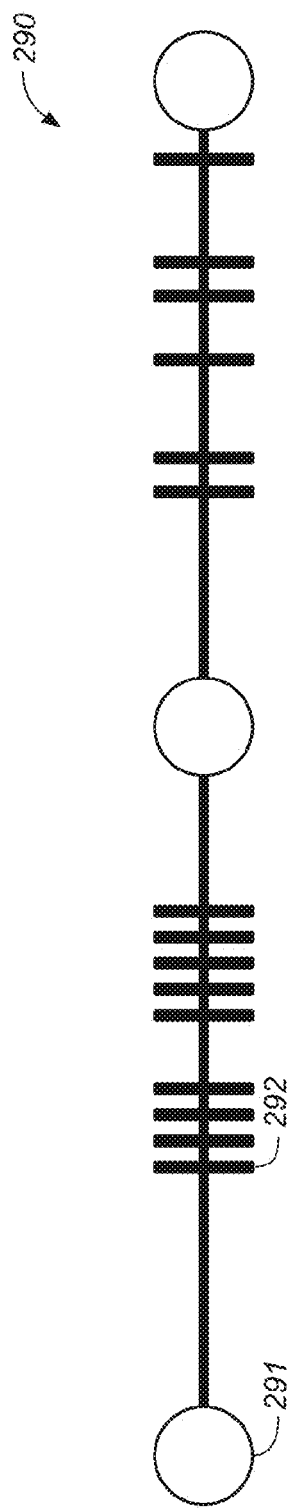

300 access a plurality of parameters from a plurality of virtual machine groupings located in a plurality of virtual data centers of the virtual computing environment _310_

↓ generate a first graph depicting overall allocation of resources and overall current usage of resources for the plurality of virtual data centers _320_

↓ generate a second graph depicting aggregate health the plurality of virtual machine groupings for one of the plurality of virtual data centers _330_

> generate a second graph depicting aggregate health of each of the plurality of virtual machine groupings of the plurality of the virtual data centers selected in the first graph _332_

↓ generate a third graph depicting allocation of resources for one of the plurality of virtual data centers overlaid with the current usage of resources of the one of the plurality of virtual data centers, wherein the first graph, the second graph and the third graph are for display in a single view _340_

> generate a third graph depicting allocation of resources for each virtual data center selected in the first graph overlaid with the current usage of resources of each of the plurality of virtual data centers selected in the first graph _342_

> generate a third graph depicting allocation of resources for one of the plurality of virtual data centers, current usage of the resources for one of the plurality of virtual data centers, and current usage of one of the plurality of virtual machine groupings overlaid with one another _344_

> generating a third graph depicting allocation of resources for one of the plurality of virtual data centers, wherein the resources comprise: CPU, memory and storage _346_

↓

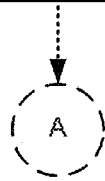

*FIG. 3A*

400 generate a first graph depicting overall allocation of resources and overall current usage of resources for each one of a plurality of virtual data centers in the virtualized computing environment 410 generate a second graph depicting aggregate health of each of a plurality of virtual machine groupings for each plurality of virtual data centers selected in the first graph 420 generate a second graph further depicting a lease length of the each of a plurality of virtual machine groupings 422 generate a second graph further depicting health, capacity and workload for the each of a plurality of virtual machine groupings 424 generate a second graph further depicting health, capacity and workload for the each of a plurality of virtual machine groupings, wherein the health, capacity and workload are separated 426 generate a third graph depicting allocation of resources overlaid with current usage of resources for each plurality of virtual data centers selected in the first graph, wherein the first graph, the second graph and the third graph are for display in a single view 430 in response to selecting one of the virtual machine groupings in the second graph, overlay resource usage of the one of the virtual machine groupings in the third graph 440 in response to selecting one of the virtual machine groupings in the second graph, display values of resource allocation, resource usage, health and lease length of the one of the virtual machine groupings 450

FIG. 4

500 generate a first graph depicting overall allocation of resources and overall current usage of resources for each one of a plurality of virtual data centers in the virtualized computing environment 510 generate a second graph depicting aggregate health of each of a plurality of virtual machine groupings for each plurality of virtual data centers selected in the first graph, wherein a virtual machine grouping is highlighted when the aggregate health of the virtual machine grouping exceeds a threshold aggregate health value 520 generate a third graph depicting allocation of resources overlaid with current usage of resources for each plurality of virtual data centers selected in the first graph, wherein the resources comprises: CPU, storage, and memory, wherein the first graph, the second graph and the third graph are for display in a single view 530 in response to selecting one of the virtual machine groupings in the second graph, overlay resource usage of the one of the virtual machine groupings in the third graph 540 in response to selecting one of the virtual machine groupings in the second graph, display values of resource allocation, resource usage, health and lease length of the one of the virtual machine groupings 550

*FIG. 5*

_600_ generate a first graph depicting a timeline of aggregate health of a virtual machine grouping of a virtual data center, wherein the timeline is separated into a plurality of time frames _610_ generate the first graph depicting the timeline of aggregate health overlaid with a problem event marker _612_

Generate a second graph depicting types of user activity for one of the plurality of time frames _620_ generate the second graph comprising a first visual indicator indicating a first type of user activity, and a second visual indicator indicating a second type of user activity _622_ generate the second graph further comprising sequential events of a plurality of users _624_ generate a third graph depicting aggregate health of the virtual machine grouping for the one of the plurality of time frames, wherein the second graph is overlaid with the third graph, and wherein the first graph, the second graph, and the third graph are for display in a single view _630_ display the first graph, the second graph, and the third graph in a single view _635_ overlay a problem event marker with the second graph and the third graph _640_ generate a fourth graph depicting aggregate user activity for the one of the plurality of time frames, wherein the first graph, the second graph, the third graph and the fourth graph are for display in the single view _645_ generate a fifth graph depicting aggregate health of each virtual machine grouping for one of a plurality of virtual data centers, wherein the first graph, the second graph, the third graph and the fifth graph are for display in the single view _650_ generate a sixth graph depicting allocation of resources for one of a virtual data centers overlaid with current usage of resources of the one of the virtual data centers, wherein the first graph, the second graph, the third graph and the sixth graph are for display in the single view _655_

*700* generate a first graph depicting a timeline of aggregate health of a selected virtual machine grouping of a virtual data center, wherein the timeline is separated into a plurality of time frames *710* generate a first graph further depicting a problem event marker overlaying the timeline *712* generate a second graph depicting sequential user events of a plurality of users, wherein the second graph is associated with a selected time frame of the first graph *720* generate a second graph further depicting different types of the user events *722* generate a third graph depicting the aggregate health of the selected virtual machine grouping for the selected time frame, wherein the second graph is overlaid with the third graph, and wherein the first graph, the second graph, and the third graph are for display in a single view *730* align the first graph with the second graph and the third graph *740* in response to selecting a problem event marker for a problem event, display a description of the problem event *750*

*FIG. 7*

800 generate a first graph depicting a timeline of aggregate health of a selected virtual machine grouping of a virtual data center, wherein the timeline is separated into a plurality of equal time frames 810 generate a second graph depicting sequential user events of a plurality of users, wherein the second graph is associated with a selected time frame of the first graph 820 generate a third graph depicting the aggregate health of the selected virtual machine grouping during the selected time frame, wherein the second graph is overlaid with the third graph 830 generate a fourth graph depicting aggregate user activity during the selected time frame, wherein the fourth graph is overlaid with the second graph and the third graph, and wherein the first graph, the second graph, the third graph and the fourth graph are for display in a single view 840 generate a fifth graph depicting aggregate health of each virtual machine grouping for the virtual data center, wherein the first graph, the second graph, the third graph and the fifth graph are for display in the single view 850 generate a sixth graph depicting allocation of resources for the virtual data center overlaid with current usage of resources of the virtual data center, wherein the first graph, the second graph, the third graph and the sixth graph are for display in the single view 860

*FIG. 8*

GRAPHING PARAMETERS OF A VIRTUALIZED COMPUTING ENVIRONMENT

CROSS-REFERENCE TO RELATED U.S. APPLICATIONS

This Application is related to U.S. patent application, Ser. No. 13/861,788, entitled, "GRAPHING PARAMETERS OF A VIRTUALIZED COMPUTING ENVIRONMENT," by Wong et al. with filing date Apr. 12, 2013, and assigned to the assignee of the present application.

BACKGROUND

Typically, organization administrators (org admins) or similar do not have a centralized view of the computing infrastructure that enables them to efficiently and quickly monitor and troubleshoot objects of interest (e.g., virtual datacenters, virtual machines, etc.). Oftentimes, any viewing of objects of interest is provided by displaying various pages that provide information in textual and/or tabular form. Additionally, the views that org admins are provided do not properly aid the org admin to effectively monitor and troubleshoot objects of interest. As a result, it is difficult for org admins to efficiently and easily view information of objects of interest.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

FIGS. 2A-G depicts graphs of a plurality of parameters of a virtualized computing environment, according to various embodiments.

FIG. 2H depicts a graph of sequential user activities, according to various embodiments.

FIGS. 3A-8 depicts methods for generating a graph of parameters of a virtualized computing environment, according to various embodiments.

DESCRIPTION OF EMBODIMENTS

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

Figure 1:
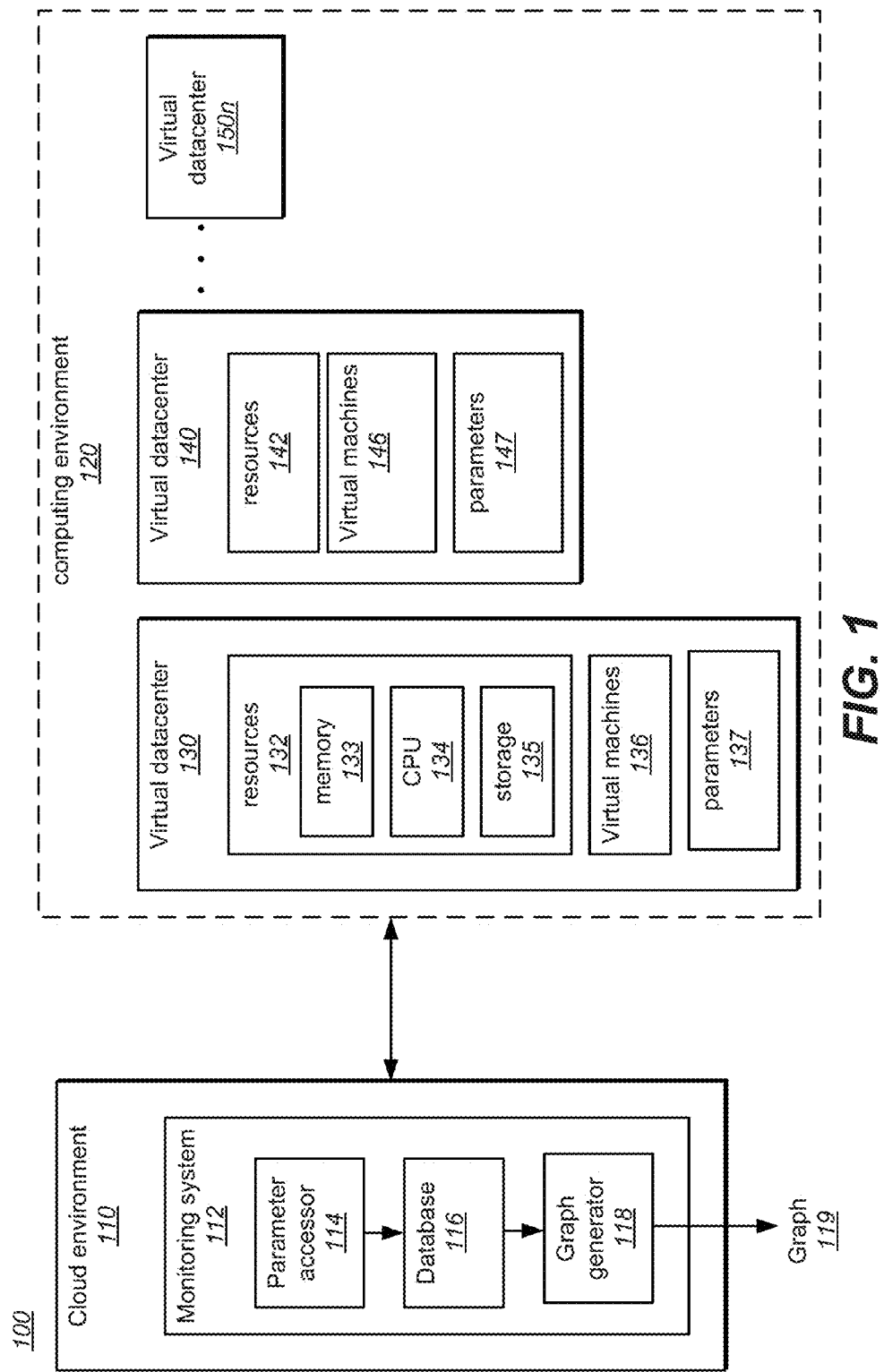
FIG. 1 is a block diagram that illustrates an embodiment of a computing system.

FIG. 1 depicts a block diagram that illustrates an embodiment of computing system 100. Computing system 100 includes, among other things, cloud environment 110 and computing environment 120. In general, computing environment 120 is communicatively coupled to cloud environment 110 and may access functionality of cloud environment 110.

Computing environment 120 includes a plurality of virtual datacenters, for example, virtual datacenter 130, virtual datacenter 140, and virtual datacenter 150n. In general, a virtual datacenter is an abstract pool of resources, such as resources 132. Resources 132 can include memory 133, central processing unit (CPU) 134, and storage 135. It is understood that a virtual data center is implemented on one or some combination of physical machines.

Computing environment 120 can include any number of virtual datacenters. For example, computing environment 120 is a corporate computing environment that includes many physical and/or virtual datacenters. In some embodiments, the virtual datacenters are associated with various groups or organizations within the corporation, such as, management, marketing, operations, testing, etc.

Virtual datacenter 130 includes a plurality of devices. The devices are any number of physical and/or virtual machines, such as virtual machines 136. For example, in one embodiment, computing environment 120 is a corporate computing environment that includes tens of thousands of physical and/or virtual machines. It is understood that a virtual machine is implemented on one or some combination of physical machines. It should be appreciated that cloud environment 110 can be communicatively coupled to any number of computing environments and associated virtual datacenters.

Virtual machines 136 may be logically grouped. That is, a subset of virtual machines may grouped together in a container (e.g., VMware vApp™). For example, three different virtual machines may be implemented for messaging. As such, the three different virtual machines are logically grouped together to facilitate in implementing messaging functionality. The virtual machines in the logical group may execute instructions alone and/or in combination (e.g., distributed) with one another. Also, the container of virtual machines and/or individual virtual machines may be controlled by a virtual management system.

Virtual machines 136 include a variety of applications (e.g., operating system). The virtual devices may have the same installed applications or may have different installed software. The installed software may be one or more software applications from one or more vendors.

Virtual datacenter 140 and virtual datacenter 150n are similar to virtual datacenter 130, described herein. For example, virtual datacenter 140 includes resources 142, virtual machines 146 and parameters 147.

Cloud environment 110 is a device comprising at least one processor and memory. As described herein, cloud environment 110 may be located in an Internet connected data center or a private cloud computing center coupled with one or more public and/or private networks. Cloud environment 110 typically couples with a virtual or physical entity in a computing environment (e.g., computing environment 120) through a network connection which may be a public network connection, private network connection, or some combination thereof. For example, a user in computing environment 120 may couple via an Internet connection with cloud environment 110 by accessing a web page or application presented by cloud environment 110 at a virtual or physical entity within computing environment 120.

Cloud environment 110 includes monitoring system 112 for monitoring computing environment 120. In general, monitoring system 112 generates graph 119 that includes various parameters (e.g., parameters 137 and parameters 147) of the virtual datacenters and/or virtual machines.

In various embodiments, graph 119 allows a user (e.g., organization administrator, etc.) to quickly and efficiently monitor, troubleshoot and/or audit computing environment 120. As will be described in further detail below, based on graph 119, a user can select various visual depictions of parameters to identify possible causes for poor health. Additionally, the user has an option to view the objects interlaced with specific users' activities over a timeframe. Also, events are correlated to problem areas, and overlaid with overall health.

Monitoring system 112 includes, among other things, parameter accessor 114, database 116 and graph generator 118. In various embodiments, anyone of or combination of parameter accessor 114, database 116 and graph generator 118 may be located in computing environment 120 or any other computing environment.

Parameter accessor 114 accesses parameters or attributes of the virtual datacenters. For example, parameter accessor 114 accesses parameters 137 of virtual datacenter 130, parameters 147 of virtual datacenter 140, and parameters of virtual datacenter 150n.

Parameters of the virtual datacenters can be any parameter or attribute that facilitates in monitoring of computing environment 120. For example, parameters can be, but are not limited to, CPU allocation, CPU usage, resource allocation, current resource usage, virtual machine aggregate health, memory allocation, memory usage, user activity, etc.

In one embodiment, the parameters are stored in database 116. For example, an application programming interface (API) is utilized to access the parameters periodically (e.g., 1-2 seconds) and the parameters are then stored in database 116 for subsequent use of graph generator 118.

Graph generator 118, as described above, accesses parameters, for example, from database 116, and generates graph 119. Graph 119 is configured to be rendered for display as a single view on a display. That is, graph 119 is generated such that it is rendered as a single viewing object on a display. As such, a user is able to easily view graph 119 on a display and view parameters of computing environment 120 for one or more of monitoring, auditing and troubleshooting of computing environment 120.

More specifically, graph 119 is utilized as an interactive user interface. For instance, graph 119 displays various pertinent computing environment parameters for a user to facilitate quick understanding of problems and pinpointing the root causes of the problems, in computing environment 120.

FIGS. 2A-I depicts graphs 200A-I, respectively. Graphs 200A-I are various embodiments related to graph 119, which will be described in further detail below.

It should be understood that utilizing any of graphs 200A-I provides a hierarchical view of various attributes, parameters, or metrics that are overlaid and/or correlated with one another. This allows a user to relationally navigate within the graphs to help determine the cause of problem events (e.g., errors) that occur in computing environment 120.

Referring now to FIG. 2A, graph 200A includes computing environment overview portion 210 which includes a global overview of allocated resources for each virtual datacenter and current usage of resources for each virtual datacenter of computing environment 120. That is, overview portion 210 depicts an overview of the entire infrastructure of computing environment 120.

For example, computing environment 120 includes seven different virtual datacenters (because seven different virtual datacenters are depicted in overview portion 210). One of the virtual datacenters is virtual datacenter 211 (depicted as the far right virtual datacenter of the seven different virtual datacenters in overview portion 210). Virtual datacenter 211 includes a bottom portion 212 that depicts the allocated resources of virtual datacenter 211 as compared to or in proportion to the allocated resources of all the other virtual datacenters. Additionally, virtual datacenter 211 includes top portion 213 that depicts the current resource usage of virtual datacenter 211 as compared to or in proportion to the current resource usage of all the other virtual datacenters.

Moreover, computing environment overview portion 210 includes window 214 which controls which virtual datacenters are viewed in other portions of graph 200A. For example, window 214 includes four virtual datacenters. The four virtual datacenters are the "Management" virtual datacenter 240, "Marketing" virtual datacenter 241, "Operations" virtual datacenter 242, and "Test" virtual datacenter 243, respectively.

It should be appreciated that window 214 can include any number of virtual datacenters. As such, any virtual datacenter located in window 214 would be viewed in other portions of graph 200A.

Graph 200A includes health portion 220 that depicts the health for virtual machines or virtual machines groupings (e.g., VMware vApp™) for each virtual datacenter. In particular, each bar, in health portion 220, represents a grouping of virtual machines. For example, virtual datacenter 240 depicts thirteen bars that represent the health of thirteen different virtual machine groupings in health portion 220, virtual datacenter 241 depicts sixteen bars that represent the health of sixteen different virtual machine groupings in health portion 220, virtual datacenter 242 depicts four bars that represents the health of four different virtual machine groupings in health portion 220, and virtual datacenter 243 depicts thirteen bars that represents the health of thirteen different virtual machine groupings in health portion 220.

In one embodiment, the height of each bar in health portion 220 represents the aggregate health of a virtual machine grouping. As such, the health of each virtual machine grouping can be compared to other virtual machine groupings within the same virtual datacenter and/or with respect to other virtual machine groupings in other virtual datacenters.

In another embodiment, the greater the length of the bar, the poorer the health of the virtual machine grouping. For example, virtual datacenter 240 includes virtual machine grouping that has poor health, which is represented by bar 222. In such an example, bar 222 for the virtual machine grouping can be shaded a different color to signify that the associated virtual machine grouping is in poor health (e.g., has an error). For instance, a bar that exceeds a predetermined threshold for poor health can be shaded a different color than bars that have not exceeded the predetermined threshold for poor health. It is noted that virtual datacenter 241 also includes a virtual machine grouping, represented by a bar that indicates the virtual machine grouping is in poor health (similar to bar 222).

In various embodiments, the health, as depicted by bars in health portion 220, is an aggregate health of the virtual machine grouping. For example, the aggregate health is comprised of three factors, such as health, capacity and workload. The health factor represents historical data and facilitates in determining whether the current state of health is different than historical states of health. The capacity factor the time remaining until the virtual machine grouping is out of computing space. The workload factor represents what resources the virtual machine grouping is currently utilizing (e.g., CPU).

In one embodiment, overall aggregate health=Max(Health, Capacity, Workload), wherein each of the Health, Capacity and Workload are normalized in a 1-100 scale.

Graph 200A includes resource portion 230. Resource portion 230 depicts memory allocation, memory usage, CPU allocation, CPU usage, storage allocation and storage usage for each virtual datacenters 240-243 (which are included in window 214). For example, virtual datacenter 240 depicts bar 231 that represents CPU allocation (in gigahertz (ghz)), bar 232 that represents memory allocation (in gigabytes (gb)), and bar 233 that represents storage allocation (in terabytes (tb)).

In various embodiments, the bars that represent each respective resource have matching visual features. For example, the bars that represent memory allocation have the same color and/or shading with respect to each other (but different than the bars that represent other resource allocations), the bars that represent have CPU allocation have the same color and/or shading with respect to each other (but different than the bars that represent other resource allocations), and the bars that represent storage allocation have the same color and/or shading with respect to each other (but different than the bars that represent other resource allocations).

In one embodiment, the surface area of bars (e.g., bars 231-233), for each virtual datacenter, represent memory allocation, CPU allocation and storage allocation, respectively, for the virtual datacenters. For example, the surface area (or width) of bar 231 depicts the CPU allocation of virtual datacenter 240 in proportion to the bars that depict CPU allocation for virtual datacenters 241-243, respectively.

Likewise, the surface area (or width) memory allocation bars (e.g., bar 232) represents the memory allocation for each of the virtual datacenters in proportion to one another. Similarly, the surface area (or width) storage allocation bars (e.g., bar 233) represents the storage allocation for each the virtual datacenters in proportion to one another.

Resource portion 230 also depicts the current usage of the resources. For example, bar 231 includes indicator 234 (e.g., another bar overlayed on bar 231) that represents the current CPU usage for virtual datacenter 240. Similarly, each bar that represents memory allocation, for each virtual datacenter, also includes a visual indicator (e.g., different shading, darker shading, etc.) that represents the current memory usage. Also, each bar that represents CPU allocation, for each virtual datacenter, also includes a visual indicator (e.g., darker shading) that represents the current CPU usage. Moreover, each bar that represents storage allocation, for each virtual datacenter, also includes a visual indicator (e.g., darker shading) that represents the current storage usage.

In one embodiment, a percentage or fraction of actual resource usage with respect to allocated resource is listed. For example, indicator 234 represents the current CPU usage for bar 231. The proportion of CPU usage as indicated by indicator 234 for virtual datacenter 240 is listed at the top of bar 231 as "10/25." That is, 10/25 of the CPU resources are current being utilized by virtual datacenter 240.

It should be appreciated that the graphs depicted herein, for example, graph 200A highlights virtual machine groupings (e.g., VMware vApps™) that a user should look at based on health attributes or metrics. Accordingly, the user uses the graphed parameters to determine what caused poor health of the virtual machine groupings.

Figure 2B:
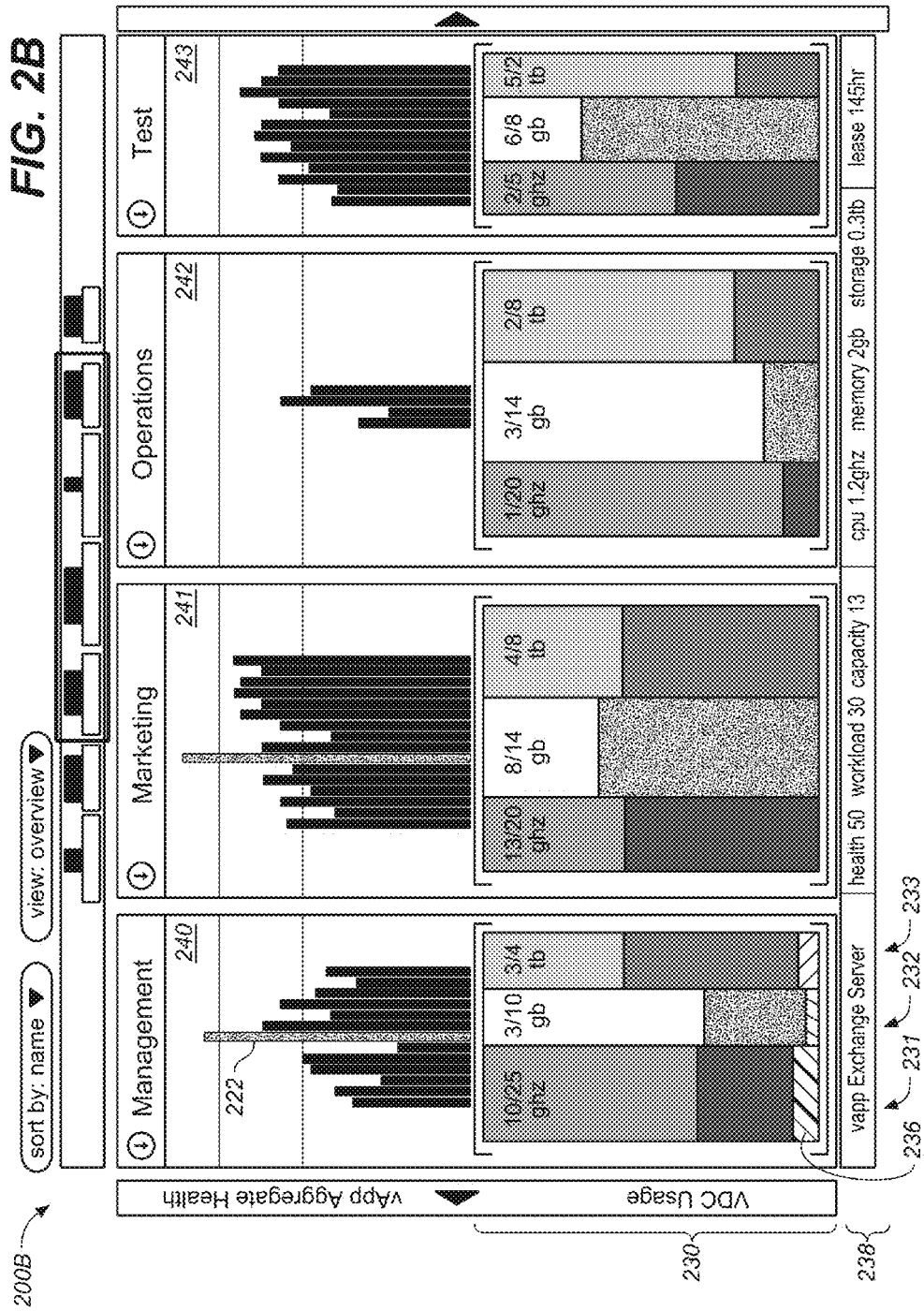

Now referring to FIG. 2B, graph 200B is similar to graph 200A, as described above. However, graph 200B includes description portion 238.

Bar 222 indicates that a virtual machine grouping is in poor health. A user may select bar 222 to view specific description or information regarding the virtual machine grouping represented by bar 222. In particular, when bar 222 is selected (e.g., by clicking on bar 222), description portion 238 appears in graph 200B. For example, description portion lists the name of the virtual machine grouping (e.g., Exchange Server), the values for health (e.g., 50), workload (e.g., 30) and capacity (e.g., 13), CPU usage (e.g., 1.2 ghz), memory usage (2 gb), storage usage (e.g., 0.3 tb) and lease length (e.g., 145 hours). It should be appreciated that other resources, information and/or description of the selected virtual machine grouping may be listed.

Resource portion 230 also includes visual indicators for the particular resource usage for the selected virtual machine grouping. For example, bar 231 includes indicator 236 (e.g., another bar overlayed on bar 231) that represents the current CPU usage for the selected virtual machine grouping. Similarly, bar 232 also includes a visual indicator (e.g., different shading, darker shading, etc.) that represents the current memory usage for the selected virtual machine grouping, and bar 233 also includes a visual indicator (e.g., different shading, darker shading, etc.) that represents the current storage usage for the selected virtual machine grouping.

Figure 2C:
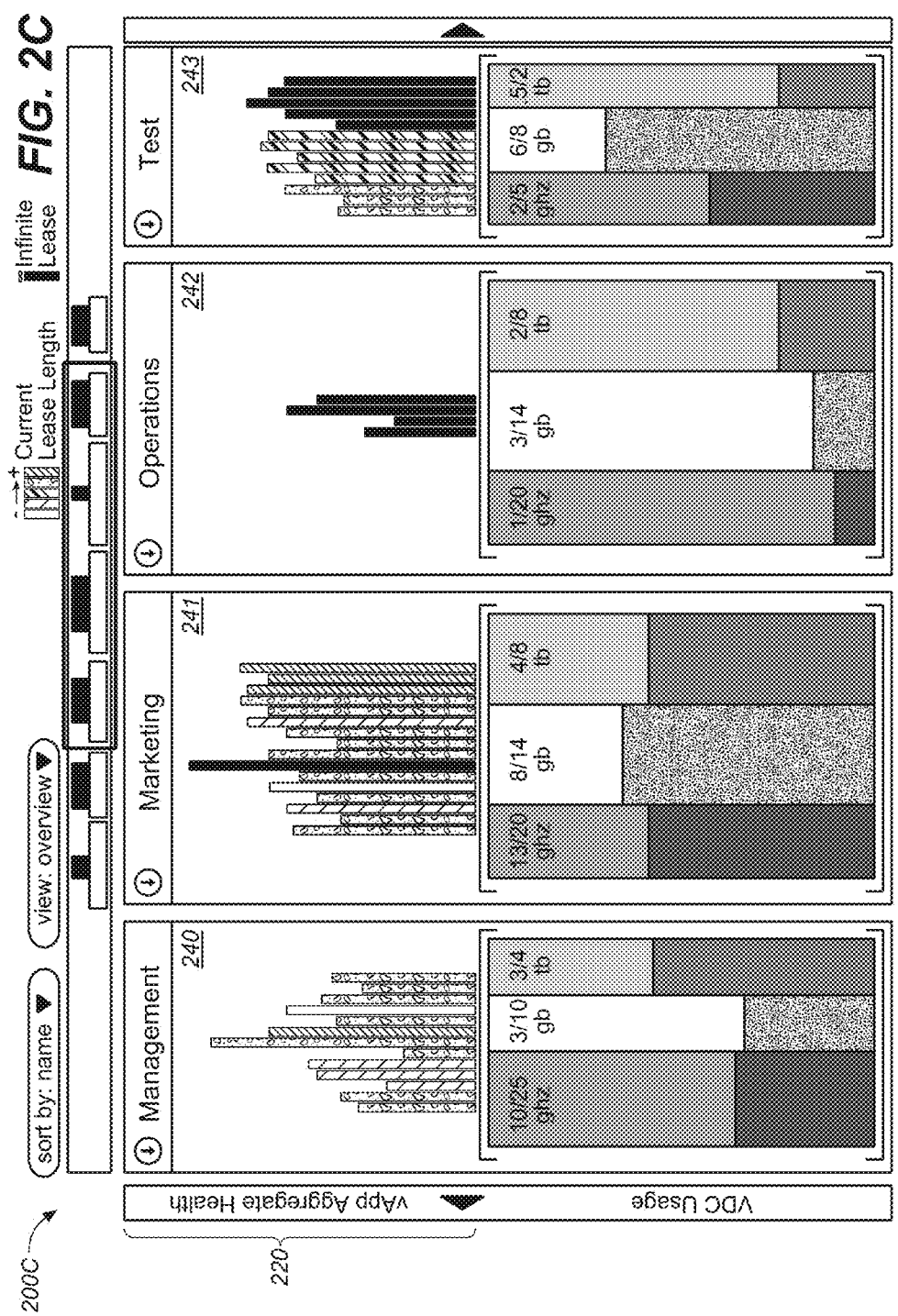

Now referring to FIG. 2C, graph 200C is similar to graph 200A, as described above. However, health portion 220 also depicts lease length of each virtual machine grouping. In particular, the bars that indicate the health of the virtual machine groupings also provide a visual indication of the lease length. For example, each bar has a particular color or shading that indicates the lease length. In one embodiment, a visual indication (e.g., color or shading) of an infinite lease length is provided.

Graph 200C allows a user to, among other things, efficiently correlate lease length with resource usage. For example, a user may determine that one or more virtual machine groupings have a long lease length (e.g., infinite), however, they are rarely or never used. Accordingly, the resources assigned to the rarely or never used virtual machine groupings are not used efficiently.

It should be appreciate that the various graphs, as described herein, are able to be switched with one another. For example, a user viewing graph 200B is able to easily switch to graph 200C if the user is interested in the lease length of the various virtual machine groupings.

Figure 2D:
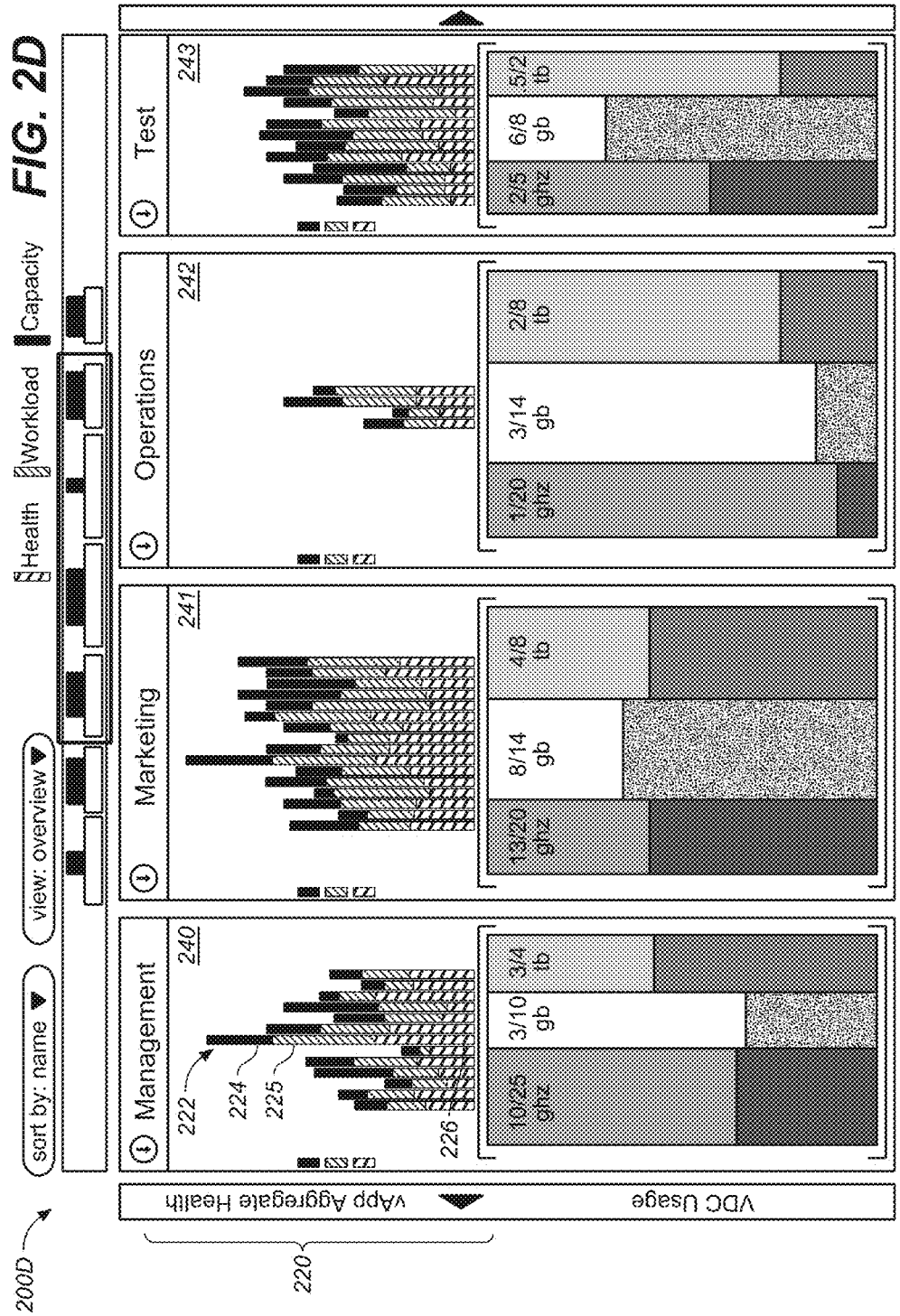

Now referring to FIG. 2D, graph 200D is similar to graph 200A, as described above. However, health portion 220 also depicts health, workload and capacity indicators for each virtual machine grouping. For example, bar 222 includes indicator 224 (e.g., color or shading) for visual indication of a capacity metric of the virtual machine grouping, indicator 225 (e.g., color or shading) for visual indication of a workload metric of the virtual machine grouping, and indicator 226 (e.g., color or shading) for visual indication of a health metric of the virtual machine grouping.

It should be appreciated that the various graphs, as described herein, may have a particular label associated with the graph. For example, graph 200D, which depicts health attributes, may be selected via a drop down tab labeled "health."

Figure 2E:
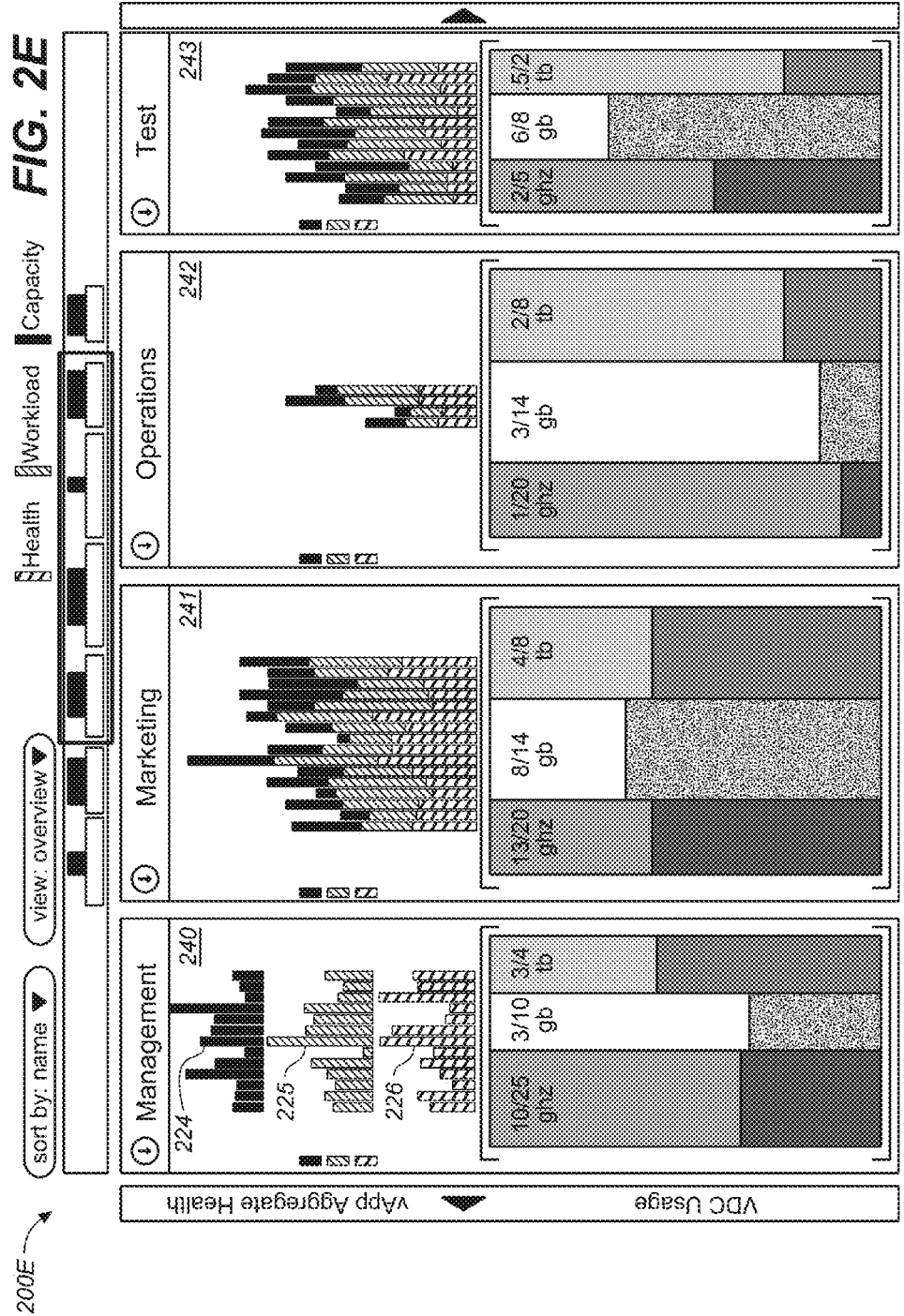

Now referring to FIG. 2E, graph 200E is similar to graph 200D, as described above. However, the health, workload and capacity indicators are separated from each other for each virtual machine grouping in a selected virtual datacenter. For example, virtual datacenter 240 is selected such that the health indicators (e.g., indicator 226), workload indicators (e.g., indicator 225) and capacity indicator (e.g., indicator 224) are separated from one another. This allows a user to efficiently compare the aggregate health values/metrics (e.g., health, workload and capacity) across virtual machine groupings within a virtual datacenter.

In various embodiments, the state of graph 200D is switched to the state of graph 200E by various user input. For example, a user may select a feature that indicates the different color coding for each aggregate health values/metrics (e.g., health, workload and capacity) to switch from graph 200E to graph 200D (and vice versa). In other words, a user may switch from a compressed view (e.g., graph 200E) to a separated view (e.g., (graph 200D), and vice versa, based on user input.

Figure 2F:
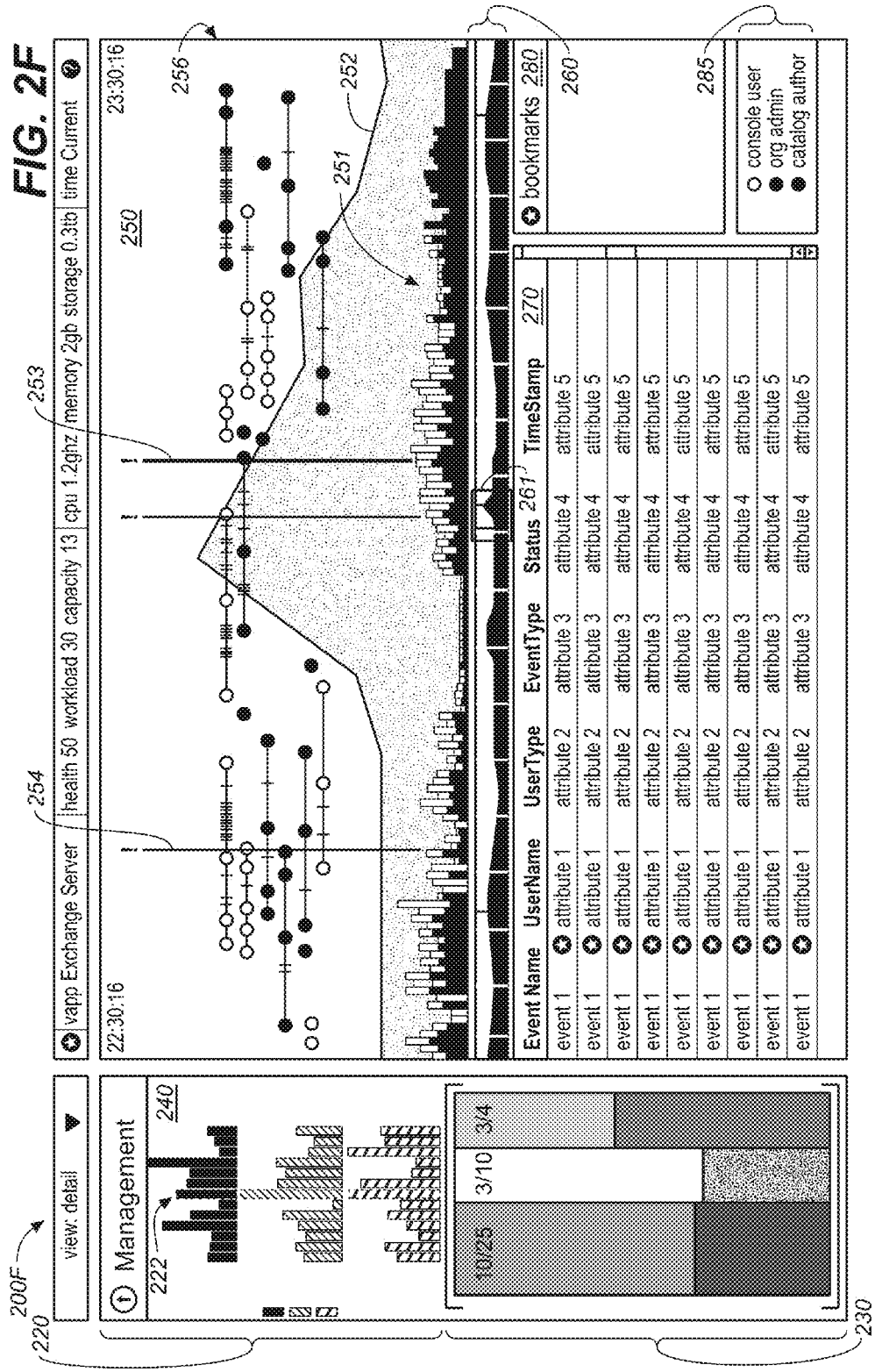

Now referring to FIG. 2F, graph 200F includes a portion of graph 200E. In particular, graph 200F includes a graph of parameters pertaining to virtual datacenter 240 (as shown in graph 200E).

Additionally, graph 200F includes portions depicting user events, of a selected virtual datacenter (or any selected virtual machine grouping), corresponding to various parameters of the selected virtual datacenter (or any selected virtual machine grouping), which will be described in further detail below. It should be appreciated that portions 220 and 230, with respect to virtual datacenter 240, may be used as a reference pane to navigate through various virtual machine groupings in virtual datacenter 240.

In one embodiment, graph 200F includes timeline portion 260. Timeline portion 260 is a graphical representation of the health of the virtual datacenter over a period of time. For example, timeline portion 260 graphically depicts the overall aggregate health of the virtual machine grouping corresponding to bar 222. Timeline portion 260 also depicts problem event markers overlaid on the overall aggregate health, which will be described in detail below.

Moreover, timeline portion 260 may be separated into time intervals, such as hours, days, weeks, etc. For example, interval 261 depicts a graphical representation of overall aggregate health and problem event markers that occurred on a selected date.

User event portion 250 depicts a graph of user events corresponding to the time interval of time interval portion 260. Moreover, user event portion 250 includes an expanded view of interval 261. For example, user event portion 250 includes, among other things, a graph of overall aggregate health 252 and problem event markers, such as problem event marker 253 and problem event marker 254. A problem event marker is a marker that marks any event that potentially decreases the health of the virtual machine grouping, such as any form of error.

In one embodiment, problem event marker 253 visually indicates a problem event of the selected virtual machine grouping on virtual datacenter 240 and problem event marker 254 visually indicates a problem event on another virtual machine grouping on virtual datacenter 240. Depicting a problem event marker on a non-selected virtual machine grouping allows a user to view similar problem events to facilitate in determining if there is any correlation between the similar problem events. For example, the same user activity may be the root cause for more than one problem event. As such, the same user activity may be determined by viewing the related problem events.

Figure 2G:
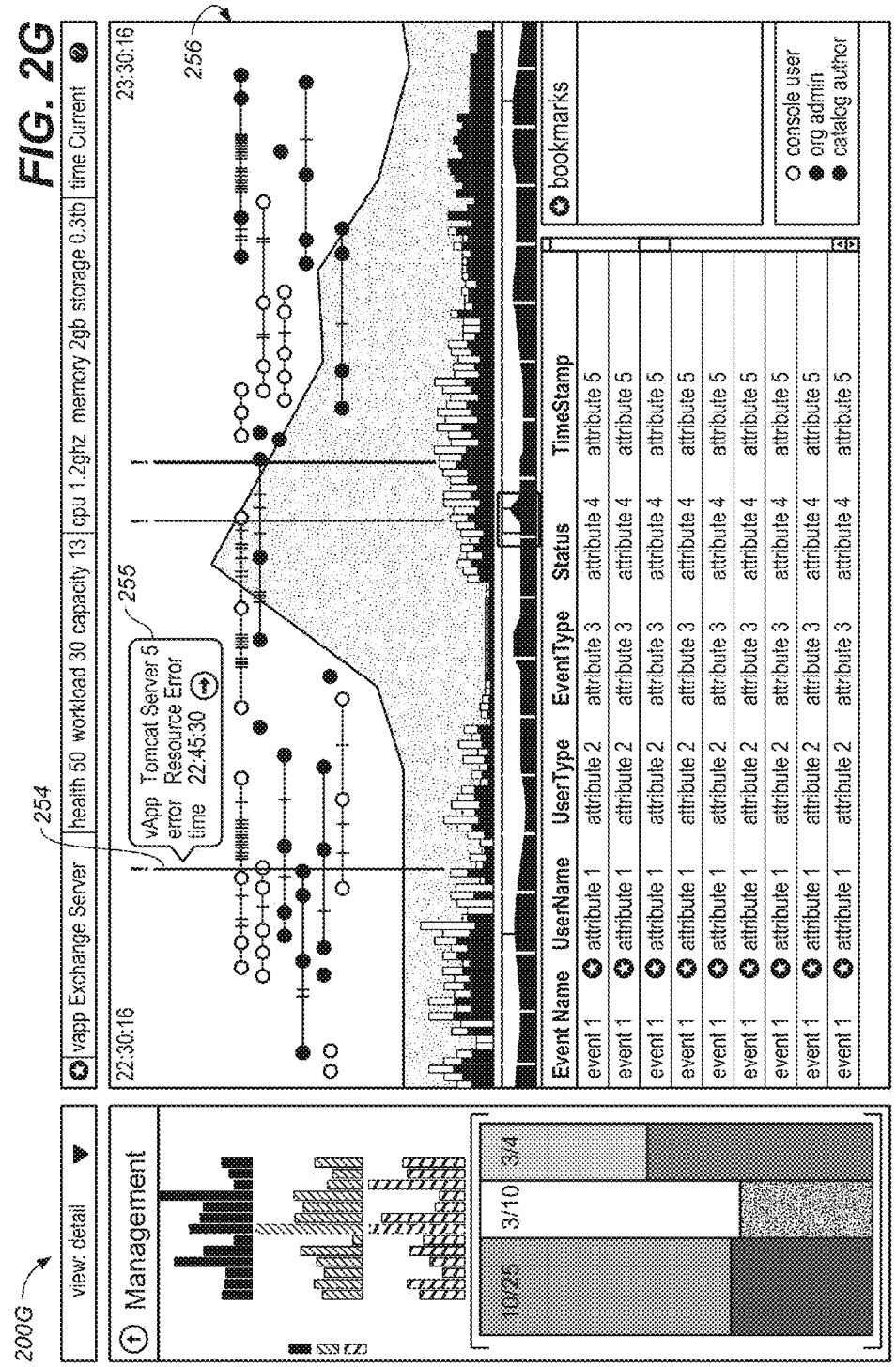

Now referring to FIG. 2G, graph 200G depicts problem event information 255. For example, when problem event marker 254 is selected, problem event information 255 is displayed. In one embodiment, problem event information 255 includes name of the virtual machine grouping where the problem event occurred, the type of error and time of the problem event.

Referring again to FIG. 2F, user event portion 250 also includes a graph of aggregate user activity 251 that corresponds to the time line of timeline portion 260. Aggregate user activity 251 depicts user activity of user groups, such as console users, organization administrators, catalog authors, etc. In one embodiment, the groups of users are listed in user group portion 285.

User event portion 250 also includes individual user activities 256. Individual user activities 256 depicts types of activities that were performed by an individual that corresponds to the timeline of timeline portion 260. Moreover, individual user activities 256 may depict the type of individual user (e.g., console user, org admin, etc.).

Individual user activities 256 allow a user to view specific activities by particular users before and/or after a problem event, such as the problem event associated with problem event marker 253.

Now referring to FIG. 2H, graph 290 depicts an embodiment of individual user activities for an individual. For example, graph 290 includes first visual indicator 291 indicating a first type of user activity and second visual indicator 292 indicating a second type of user activity. For example, first visual indicator 291 may indicate important or impactful (but less frequent) user activities, such as an error. Second visual indicator 292 may indicate less important or less impactful (but more frequent) user activities, such as user log-on.

In one embodiment, graph 290 depicts a single user's sequential activity over a selected time frame.

Referring again to FIG. 2F, graph 200F includes contextual information portion 270. Contextual information portion 270 provides information associated with various attributes that are depicted in graph 200F. For example, contextual information portion 270 may list one or more of event name, user name, user type, event type, status, time stamp, etc.

Figure 2I:
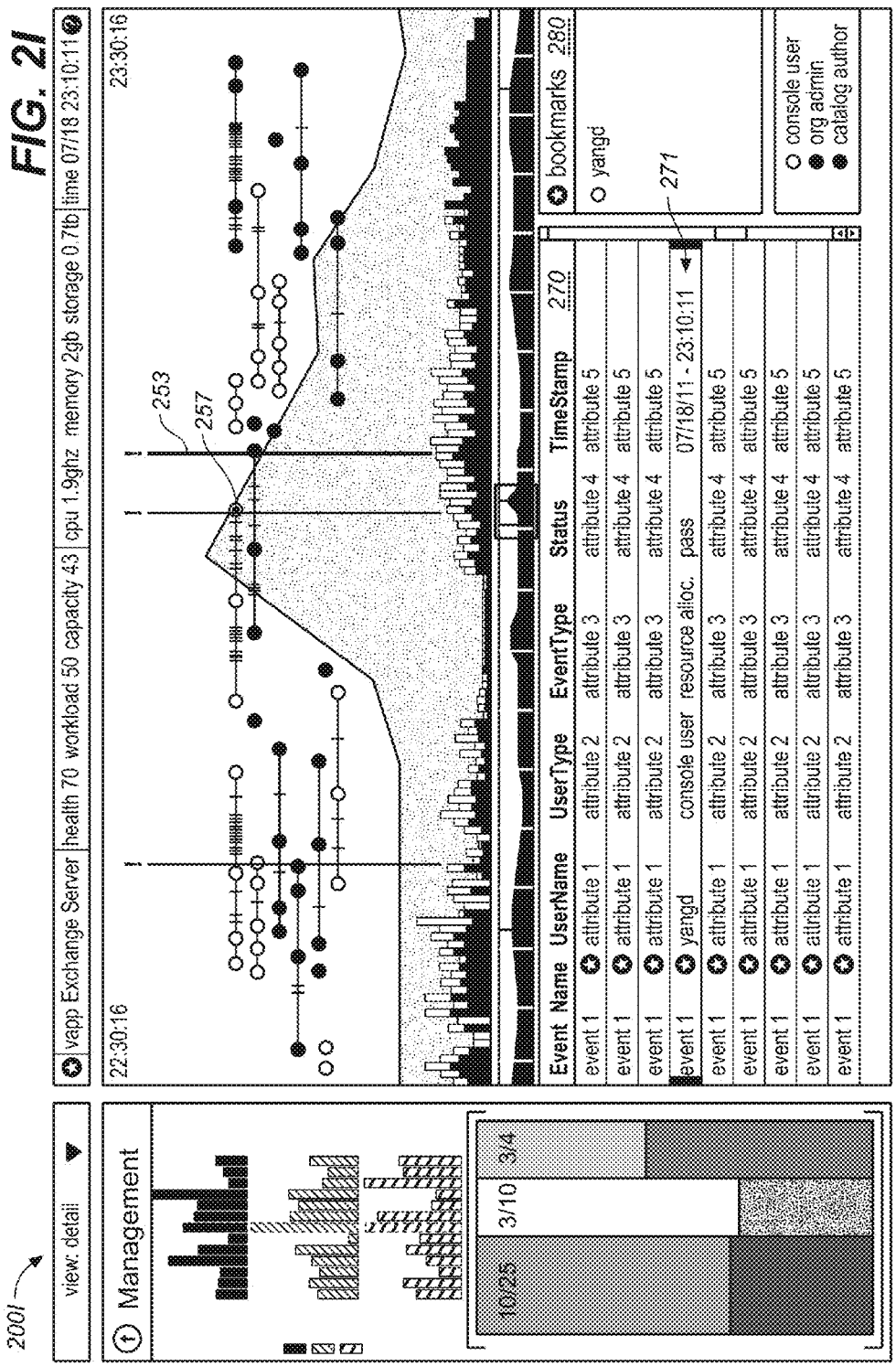
FIG. 2I depicts a graph of a plurality of parameters of a virtualized computing environment, according to various embodiments.

Now referring to FIG. 2I, graph 200I depicts an embodiment of a selection of a particular user activity and displaying information associated with the selected user activity. For example, user activity 257 is selected because it is an important event that occurred immediately prior to a problem event of problem event marker 253. In response to the selection of user activity 257, information associated with user activity 257 is displayed in contextual information portion 270 at row 271. Row 271 displays, in one embodiment, event name, user name (e.g., yangd), user type (e.g., console user), event type (e.g., resource allocation), status (e.g., pass) and a time stamp.

Moreover, the console user (e.g., yangd) may be bookmarked and listed in bookmark portion 280. A bookmark allows a user to track other user events of the bookmarked user.

Moreover, a user (e.g., yangd) may be "pinned" such that the user's activities may be viewed. For example, user activity across various virtual machine groupings or various virtual datacenters (e.g., virtual datacenters 240-243) may be viewed. As a result, the viewed activities of a user in one virtual datacenter may help troubleshoot problem events associated with user events in another virtual datacenter.

In various embodiments, bookmark portion 280 can include bookmarks of any user and/or virtual machine grouping (e.g., exchange server). For example, if an exchange server is bookmarked, a user can track and view any event that occurs within the exchange server. In such an example, particular event information may be displayed in contextual information portion 270.

Example Methods of Operation

The following discussion sets forth in detail the operation of some example methods of operation of embodiments. With reference to FIGS. 3A-8, flow diagrams 300, 400, 500, 600, 700 and 800 illustrate example procedures used by various embodiments. Flow diagrams 300, 400, 500, 600, 700 and 800 include some procedures that, in various embodiments, are carried out by a processor under the control of computer-readable and computer-executable instructions. In this fashion, procedures described herein and in conjunction with flow diagrams 300, 400, 500, 600, 700 and 800 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments (e.g. computing environment 120) and/or cloud environments (e.g., cloud environment 110). The computer-readable and computer-executable instructions, which reside on tangible computer readable storage media, are used to control or operate in conjunction with, for example, one or some combination of processors of the computer environments and/or cloud environment 110. It is appreciated that the processor(s) may be physical or virtual or some combination (it should also be appreciated that a virtual processor is implemented on physical hardware). Although specific procedures are disclosed in flow diagrams 300, 400, 500, 600, 700 and/or 800, such procedures are examples. That is, embodiments are well suited to performing various other procedures or variations of the procedures recited in flow diagrams 300, 400, 500, 600, 700 and/or 800. Likewise, in some embodiments, the procedures in flow diagrams 300, 400, 500, 600, 700 and/or 800 may be performed in an order different than presented and/or not all of the procedures described in one or more of these flow diagrams may be performed. It is further appreciated that procedures described in flow diagrams 300, 400, 500, 600, 700 and/or 800 may be implemented in hardware, or a combination of hardware with firmware and/or software.

FIGS. 3A-8 depicts flow diagrams for a method of generating a graph of parameters of a virtualized computing environment, according to various embodiments.

Figure 3B:
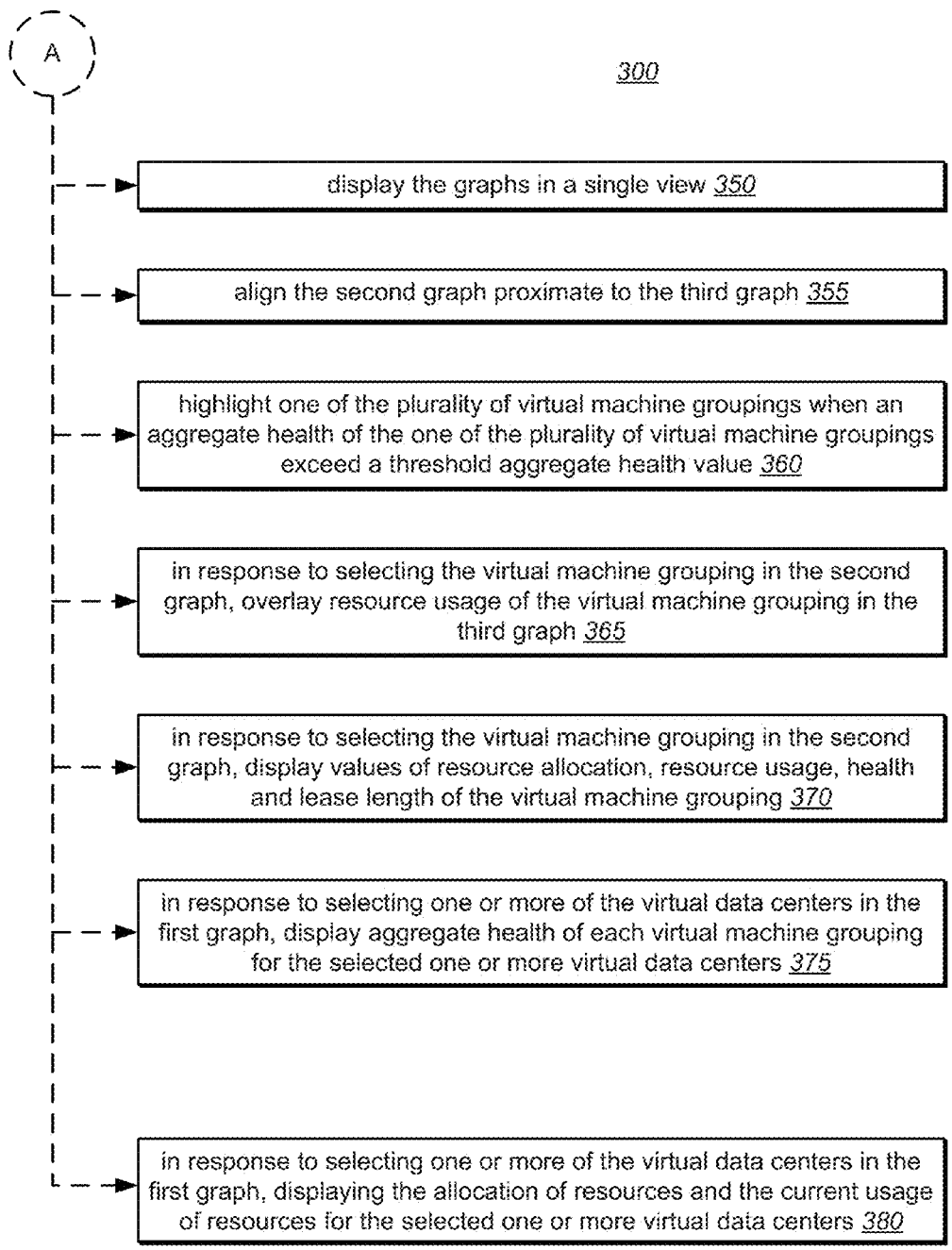

Referring now to FIGS. 3A-B, at 310, a plurality of parameters are accessed from a plurality of virtual machine groupings located in a plurality of virtual data centers of the virtual computing environment. For example, parameter accessor 114 accesses parameters (e.g., resource allocation, resource use, lease length, etc.) of computing environment 120.

The accessing, in one embodiment, is automatically accomplished by parameter accessor 114 of a computing system, such as cloud environment 110 or computing environment 120. For example, based on instructions from monitoring system 112, parameter accessor 114 automatically periodically accesses parameters of virtual machines.

At 320, a first graph is generated depicting overall allocation of resources and overall current usage of resources for the plurality of virtual data centers. For example, the first graph (e.g., portion 210) is generated by graph generator 118.

The graph generation, in one embodiment, is automatically accomplished by graph generator 118 of a computing system, such as cloud environment 110 or computing environment 120. For example, based on instructions from monitoring system 112, graph generator 118 generates one or more graphs to facilitate monitoring.

At 330, a second graph is generated depicting aggregate health the plurality of virtual machine groupings for one of the plurality of virtual data centers. For example, graph generator 118 accesses the parameters from database 116 and generates the second graph (e.g., portion 220). The graph generation, in one embodiment, is automatically accomplished by monitoring system 112 of a computing system, such as cloud environment 110 or computing environment 120. For example, based on instructions from monitoring system 112, portion 220 is automatically generated by graph generator 118.

At 332, in one embodiment, a second graph is generated depicting aggregate health of each of the plurality of virtual machine groupings of the plurality of the virtual data centers selected in the first graph. For example, portion 220 is generated for each virtual machine groupings for virtual datacenters 240-243.

At 340, a third graph is generated depicting allocation of resources for one of the plurality of virtual data centers overlaid with the current usage of resources of the one of the plurality of virtual data centers, wherein the first graph, the second graph and the third graph are for display in a single view.

For example, graph generator 118 accesses the parameters from database 116 and generates the third graph (e.g., portion 230). The graph generation, in one embodiment, is automatically accomplished by monitoring system 112 of a computing system, such as cloud environment 110 or computing environment 120. For example, based on instructions from monitoring system 112, portion 230 is automatically generated by graph generator 118.

At 342, in one embodiment, a third graph is generated depicting allocation of resources for each virtual data center selected in the first graph overlaid with the current usage of resources of each of the plurality of virtual data centers selected in the first graph. For example, portion 230 depicts allocation of virtual datacenter resources overlaid with the current usage of resources (e.g., indicator 234) of the virtual datacenters.

At 344, in another embodiment, a third graph is generated depicting allocation of resources for one of the plurality of virtual data centers, current usage of the resources for one of the plurality of virtual data centers, and current usage of one of the plurality of virtual machine groupings overlaid with one another. For example, portion 230 depicts allocation of virtual datacenter resources and the current usage of resources (e.g., indicator 234) of the virtual datacenters overlaid with current resource usage (e.g., indicator 236) of one of the virtual machine groupings.

At 346, in a further embodiment, a third graph is generated depicting allocation of resources for one of the plurality of virtual data centers, wherein the resources comprise: CPU, memory and storage. For example, portion 230 depicts allocation of the following resources: CPU (e.g., bar 231), memory (e.g., bar 232), and storage (e.g., bar 233).

At 350, the graphs are displayed in a single view. For example, portion 210, portion 220 and portion 230 are displayed as a single graph for display in a single view.

At 355, the second graph is aligned proximate to the third graph. For example, portion 220 is disposed directly above and in alignment with portion 230. Accordingly, a user is able to readily view any relationships between attributes graphed in portions 220 and 230.

At 360, one of the plurality of virtual machine groupings are highlighted when an aggregate health of the one of the plurality of virtual machine groupings exceed a threshold aggregate health value. For example, bar 222 (which represents a virtual machine grouping) is highlighted, with respect to other virtual machine groupings, because it has exceeded a predetermined threshold aggregate health value. Accordingly, a user is able to quickly determine based on the highlighting, that the virtual machine grouping is unhealthy and the user can then look at particular user activities in the unhealthy virtual machine grouping.

At 365, in response to selecting the virtual machine grouping in the second graph, resource usage of the virtual machine grouping is overlaid in the third graph. For example, a user selects bar 222 (which represents a virtual machine grouping). Accordingly, the resource usage (e.g., indicator 236) is overlaid in portion 230.

At 370, in response to selecting the virtual machine grouping in the second graph, values are displayed of resource allocation, resource usage, health and lease length of the virtual machine grouping. For example, a user selects bar 222 (which represents a virtual machine grouping). Accordingly, portion 238 is displayed that depicts various attributes, such as, resource allocation, resource usage, health and lease length of the virtual machine grouping.

At 375, in response to selecting one or more of the virtual datacenters in the first graph, aggregate health of each virtual machine grouping for the selected one or more virtual datacenters is displayed. For example, a user selects virtual datacenters via window 214. Accordingly, the aggregate health of the virtual machine groupings in the selected virtual datacenters are displayed in portion 220.

At 380, in response to selecting one or more of the virtual data centers in the first graph, the allocation of resources and the current usage of resources for the selected one or more virtual data centers are displayed. For example, a user selects virtual datacenters via window 214. Accordingly, the allocation of resources and the current usage of resources for the selected virtual datacenters are displayed in portion 230.

It is noted that any of the procedures, stated above, regarding flow diagram 300 may be implemented in hardware, or a combination of hardware with firmware and/or software. For example, any of the procedures are implemented by a processor(s) of cloud environment 110 and/or computing environment 120.

Referring now to FIG. 4, at 410, a first graph is generated depicting overall allocation of resources and overall current usage of resources for each one of a plurality of virtual data centers in the virtualized computing environment. For example, the first graph (e.g., portion 210) is generated by graph generator 118. The graph generation, in one embodiment, is automatically accomplished by graph generator 118 of a computing system, such as cloud environment 110 or computing environment 120. For example, based on instructions from monitoring system 112, graph generator 118 generates one or more graphs to facilitate monitoring.

At 420, a second graph is generated depicting aggregate health of each of a plurality of virtual machine groupings for each plurality of virtual data centers selected in the first graph. For example, graph generator 118 accesses the parameters from database 116 and generates the second graph (e.g., portion 220) for each of the selected virtual datacenters. The graph generation, in one embodiment, is automatically accomplished by monitoring system 112 of a computing system, such as cloud environment 110 or computing environment 120. For example, based on instructions from monitoring system 112, portion 220 is automatically generated by graph generator 118.

At 422, in one embodiment, a second graph is generated further depicting a lease length of the each of a plurality of virtual machine groupings. For example, in portion 220, the bars that indicate the health of the virtual machine groupings also provide a visual indication of the lease length. In such an example, each bar has a particular color or shading that indicates the lease length.

At 424, in another embodiment, generate a second graph further depicting health, capacity and workload for the each of a plurality of virtual machine groupings. For example, referring to FIG. 2D, bar 222 includes indicator 224 (e.g., color or shading) for visual indication of a capacity metric of the virtual machine grouping, indicator 225 (e.g., color or shading) for visual indication of a workload metric of the virtual machine grouping, and indicator 226 (e.g., color or shading) for visual indication of a health metric of the virtual machine grouping.

A 426, in a further embodiment, a second graph is generated further depicting health, capacity and workload for the each of a plurality of virtual machine groupings, wherein the health, capacity and workload are separated. For example, referring to FIG. 2E, bar 222 includes indicator 224 (e.g., color or shading) for visual indication of a capacity metric of the virtual machine grouping, indicator 225 (e.g., color or shading) for visual indication of a workload metric of the virtual machine grouping, and indicator 226 (e.g., color or shading) for visual indication of a health metric of the virtual machine grouping, wherein the indicators are separated from each other.

At 430, a third graph is generated depicting allocation of resources overlaid with current usage of resources for each plurality of virtual data centers selected in the first graph, wherein the first graph, the second graph and the third graph are for display in a single view. For example, graph generator 118 accesses the parameters from database 116 and generates the third graph (e.g., portion 230). The graph generation, in one embodiment, is automatically accomplished by monitoring system 112 of a computing system, such as cloud environment 110 or computing environment 120. For example, based on instructions from monitoring system 112, portion 230 is automatically generated by graph generator 118.

At 440, in response to selecting the virtual machine grouping in the second graph, resource usage of the virtual machine grouping is overlaid in the third graph. For example, a user selects bar 222 (which represents a virtual machine grouping). Accordingly, the resource usage (e.g., indicator 236) is overlaid in portion 230.

At 450, in response to selecting the virtual machine grouping in the second graph, values are displayed of resource allocation, resource usage, health and lease length of the virtual machine grouping. For example, a user selects bar 222 (which represents a virtual machine grouping). Accordingly, portion 238 is displayed that depicts various attributes, such as, resource allocation, resource usage, health and lease length of the virtual machine grouping.

It is noted that any of the procedures, stated above, regarding flow diagram 400 may be implemented in hardware, or a combination of hardware with firmware and/or software. For example, any of the procedures are implemented by a processor(s) of cloud environment 110 and/or computing environment 120.

Referring now to FIG. 5, at 510, a first graph is generated depicting overall allocation of resources and overall current usage of resources for each one of a plurality of virtual data centers in the virtualized computing environment. For example, the first graph (e.g., portion 210) is generated by graph generator 118. The graph generation, in one embodiment, is automatically accomplished by graph generator 118 of a computing system, such as cloud environment 110 or computing environment 120. For example, based on instructions from monitoring system 112, graph generator 118 generates one or more graphs to facilitate monitoring.

At 520, a second graph is generated depicting aggregate health of each of a plurality of virtual machine groupings for each plurality of virtual data centers selected in the first graph, wherein a virtual machine grouping is highlighted when the aggregate health of the virtual machine grouping exceeds a threshold aggregate health value. For example, graph generator 118 accesses the parameters from database 116 and generates the second graph (e.g., portion 220) for each of the selected virtual datacenters. In particular, portion 220 depicts aggregate health for each virtual machine grouping for each virtual datacenter selected in portion 210. Moreover, any virtual machine grouping that exceeds a predetermined threshold is highlighted.

The graph generation, in one embodiment, is automatically accomplished by monitoring system 112 of a computing system, such as cloud environment 110 or computing environment 120. For example, based on instructions from monitoring system 112, portion 220 is automatically generated by graph generator 118.

At 530, a third graph is generated depicting allocation of resources overlaid with current usage of resources for each plurality of virtual data centers selected in the first graph, wherein the resources comprises: CPU, storage, and memory, wherein the first graph, the second graph and the third graph are for display in a single view. For example, graph generator 118 accesses the parameters from database 116 and generates the third graph (e.g., portion 230). In particular, portion 230 depicts the CPU, storage, and memory allocation and the current CPU usage, storage usage and memory usage.

The graph generation, in one embodiment, is automatically accomplished by monitoring system 112 of a computing system, such as cloud environment 110 or computing environment 120. For example, based on instructions from monitoring system 112, portion 230 is automatically generated by graph generator 118.

At 540, in response to selecting the virtual machine grouping in the second graph, resource usage of the virtual machine grouping is overlaid in the third graph. For example, a user selects bar 222 (which represents a virtual machine grouping). Accordingly, the resource usage (e.g., indicator 236) is overlaid in portion 230.

At 550, in response to selecting the virtual machine grouping in the second graph, values are displayed of resource allocation, resource usage, health and lease length of the virtual machine grouping. For example, a user selects bar 222 (which represents a virtual machine grouping). Accordingly, portion 238 is displayed that depicts various attributes, such as, resource allocation, resource usage, health and lease length of the virtual machine grouping.

It is noted that any of the procedures, stated above, regarding flow diagram 500 may be implemented in hardware, or a combination of hardware with firmware and/or software. For example, any of the procedures are implemented by a processor(s) of cloud environment 110 and/or computing environment 120.

Figure 6B:
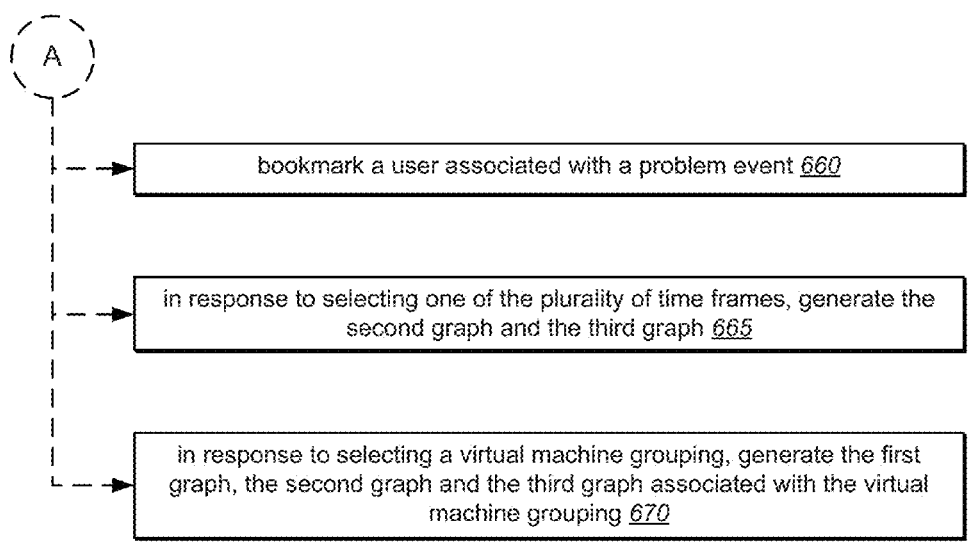

Referring now to FIGS. 6A-B, at 610, a first graph is generated depicting a timeline of aggregate health of a virtual machine grouping of a virtual data center, wherein the timeline is separated into a plurality of time frames or time intervals. For example, the first graph (e.g., portion 260) is generated by graph generator 118. The graph generation, in one embodiment, is automatically accomplished by graph generator 118 of a computing system, such as cloud environment 110 or computing environment 120. For example, based on instructions from monitoring system 112, graph generator 118 generates one or more graphs to facilitate monitoring.

At 612, in one embodiment, the first graph is generated depicting the timeline of aggregate health overlaid with a problem event marker. For example, a problem event marker is overlaid on the timeline, in portion 260. As a result, a relationship between problem events and aggregate health can be determined.

At 620, a second graph is generated depicting types of user activity for one of the plurality of time frames. For example, second graph (e.g., user activities 256) is generated by graph generator 118. The graph generation, in one embodiment, is automatically accomplished by graph generator 118 of a computing system, such as cloud environment 110 or computing environment 120.

At 622, the second graph is generated comprising a first visual indicator indicating a first type of user activity, and a second visual indicator indicating a second type of user activity. For example, graph 290, as shown in FIG. 2H, includes first visual indicator 291 indicating a first type of user activity and second visual indicator 292 indicating a second type of user activity. The first visual indicator 291 may indicate important or very impactful (but less frequent) user activities, such as an error. Second visual indicator 292 may indicate less important or impactful (but more frequent) user activities, such as user log-on.

At 624, the second graph is generated further comprising sequential events of a plurality of users. For example, visual indicator 291 and 292 depict sequential events performed by a user.

At 630, a third graph is generated depicting aggregate health of the virtual machine grouping for the one of the plurality of time frames, wherein the second graph is overlaid with the third graph, and wherein the first graph, the second graph, and the third graph are for display in a single view. For example, graph generator 118 accesses the parameters from database 116 and generates a third graph (e.g., overall aggregate health 252).

At 635, the first graph, the second graph, and the third graph are displayed in a single view. For example, portion 260 portion 210, user activity 256, and overall aggregate health 252 are displayed as a single graph for display in a single view.

At 640, a problem event marker is overlaid with the second graph and the third graph. For example, problem event markers 253 and 254 are overlaid with the second graph and the third graph.

At 645, a fourth graph is generated depicting aggregate user activity for the one of the plurality of time frames, wherein the first graph, the second graph, the third graph and the fourth graph are for display in the single view. For example, aggregate user activity 251 is generated and displayed with other graphs for display in a single view.

At 650, a fifth graph depicting aggregate health of each virtual machine grouping for one of a plurality of virtual data centers, wherein the first graph, the second graph, the third graph and the fifth graph are for display in the single view. For example, portion 220 is generated depicting various virtual machine groupings in a virtual datacenter.

At 655, a sixth graph is generated depicting allocation of resources for one of a virtual data centers overlaid with current usage of resources of the one of the virtual data centers, wherein the first graph, the second graph, the third graph and the sixth graph are for display in the single view. For example, portion 230 is generated depicting various resource allocations and resource usage.

At 660, a user associated with a problem event is bookmarked. For example, a user may be bookmarked or "pinned" such that the user's activities may be viewed. For instance, user activity across various virtual machine groupings or various virtual datacenters (e.g., virtual datacenters 240-243) may be viewed. As a result, the viewed activities of a user in one virtual datacenter may help troubleshoot problem events associated with user events in another virtual datacenter.

At 665, in response to selecting one of the plurality of time frames, the second graph and the third graph are generated. For example, a user selects interval 261. Accordingly, the first graph and the second graph that are associated with interval 261 are generated.

At 670, in response to selecting a virtual machine grouping, the first graph, the second graph and the third graph associated with the virtual machine grouping are generated. For example, a user selects a virtual machine group in portion 220. Accordingly, the first, second and third graphs, that correspond to the selected virtual machine group are generated.

It is noted that any of the procedures, stated above, regarding flow diagram 600 may be implemented in hardware, or a combination of hardware with firmware and/or software. For example, any of the procedures are implemented by a processor(s) of cloud environment 110 and/or computing environment 120.

Referring now to FIG. 7, at 710, a first graph is generated depicting a timeline of aggregate health of a selected virtual machine grouping of a virtual data center, wherein the timeline is separated into a plurality of time frames. For example, the first graph (e.g., portion 260) is generated by graph generator 118. The graph generation, in one embodiment, is automatically accomplished by graph generator 118 of a computing system, such as cloud environment 110 or computing environment 120. For example, based on instructions from monitoring system 112, graph generator 118 generates one or more graphs to facilitate monitoring.

At 712, a first graph is generated further depicting a problem event marker overlaying the timeline. For example, a problem event marker is overlaid on the timeline, in portion 260. As a result, a relationship between problem events and aggregate health can be determined.

At 720, a second graph is generated depicting sequential user events of a plurality of users, wherein the second graph is associated with a selected time frame of the first graph. For example, visual indicator 291 and 292 depict sequential events performed by a user.

At 722, a second graph is generated further depicting different types of the user events. For example, graph 290, as shown in FIG. 2H, includes first visual indicator 291 indicating a first type of user activity and second visual indicator 292 indicating a second type of user activity. The first visual indicator 291 may indicate important or very impactful (but less frequent) user activities, such as an error. Second visual indicator 292 may indicate less important or impactful (but more frequent) user activities, such as user log-on.

At 730, a third graph is generated depicting the aggregate health of the selected virtual machine grouping for the selected time frame, wherein the second graph is overlaid with the third graph, and wherein the first graph, the second graph, and the third graph are for display in a single view. For example, graph generator 118 accesses the parameters from database 116 and generates a third graph (e.g., overall aggregate health 252).

At 740, the first graph is aligned with the second graph and the third graph. Accordingly, a user is able to visually determine possible relationships between depicted attributes in the aligned graphs.

At 750, in response to selecting a problem event marker for a problem event, a description of the problem event is displayed. For example, when problem event marker 254 is selected, problem event information 255 is displayed that depicts particular information regarding the problem event.

It is noted that any of the procedures, stated above, regarding flow diagram 700 may be implemented in hardware, or a combination of hardware with firmware and/or software. For example, any of the procedures are implemented by a processor(s) of cloud environment 110 and/or computing environment 120.

Referring now to FIG. 8, at 810, a first graph is generated depicting a timeline of aggregate health of a selected virtual machine grouping of a virtual data center, wherein the timeline is separated into a plurality of equal time frames. For example, the first graph (e.g., portion 260) is generated by graph generator 118. The graph generation, in one embodiment, is automatically accomplished by graph generator 118 of a computing system, such as cloud environment 110 or computing environment 120. For example, based on instructions from monitoring system 112, graph generator 118 generates one or more graphs to facilitate monitoring.

At 820, a second graph is generated depicting sequential user events of a plurality of users, wherein the second graph is associated with a selected time frame of the first graph. For example, visual indicator 291 and 292 depict various sequential events performed by a user. Additionally, the user activities 256 are the user activities during the selected time interval 162 (or selected time frame).

At 830, a third graph is generated depicting the aggregate health of the selected virtual machine grouping during the selected time frame, wherein the second graph is overlaid with the third graph. For example, graph generator 118 accesses the parameters from database 116 and generates a third graph (e.g., overall aggregate health 252).

At 840, a fourth graph is generated depicting aggregate user activity during the selected time frame, wherein the fourth graph is overlaid with the second graph and the third graph, and wherein the first graph, the second graph, the third graph and the fourth graph are for display in a single view.

At 850, a fifth graph is generated depicting aggregate health of each virtual machine grouping for the virtual data center, wherein the first graph, the second graph, the third graph and the fifth graph are for display in the single view.

At 850, a sixth graph is generated depicting allocation of resources for the virtual data center overlaid with current usage of resources of the virtual data center, wherein the first graph, the second graph, the third graph and the sixth graph are for display in the single view.

It is noted that any of the procedures, stated above, regarding flow diagram 800 may be implemented in hardware, or a combination of hardware with firmware and/or software. For example, any of the procedures are implemented by a processor(s) of cloud environment 110 and/or computing environment 120.

Example embodiments of the subject matter are thus described. Although various embodiments of the have been described in a language specific to structural features and/or methodological acts, it is to be understood that the appended claims are not necessarily limited to the specific features or acts described above. Rather, the specific features and acts described above are disclosed as example forms of implementing the claims and their equivalents. Moreover, examples and embodiments described herein may be implemented alone or in various combinations with one another.

The invention claimed is:

1. A computer-implemented method for generating a graph of parameters of a virtualized computing environment, said computer-implemented method comprising:
    operating said virtualized computing environment, wherein said virtualized computing environment comprises a plurality of virtual data centers and a plurality of virtual machines, said plurality of virtual data centers and said plurality of virtual machines are implemented within at least one physical machine, and wherein said plurality of virtual machines comprise installed applications;
    automatically periodically accessing, by a processor, a plurality of parameters from a plurality of virtual machine groupings located in said plurality of virtual data centers of said virtual computing environment, wherein said plurality of parameters comprises: allocation of resources, current usage of resources, and health;
    generating, by said processor, a first graph depicting overall allocation of resources and overall current usage of resources for said plurality of virtual data centers;
    generating, by said processor, a second graph depicting aggregate health of said plurality of virtual machine groupings for one of said plurality of virtual data centers, wherein said aggregate health is comprised of a plurality of factors, wherein each factor of said plurality of factors is visually distinct;
    generating, by said processor, a third graph depicting allocation of resources for one of said plurality of virtual data centers overlaid with said current usage of resources of said one of said plurality of virtual data centers, wherein said first graph, said second graph and said third graph are for rendering in a single view;
    displaying, by said processor, said first graph, said second graph, and said third graph in a single view of a display, wherein said single view provides a hierarchical view of said plurality of resources such that said first graph, said second graph and said third graph are relationally navigable;
    aligning, by said processor, said second graph proximate to said third graph such that a user can view relationships between said aggregate health of said plurality of virtual machine groupings for one of said plurality of virtual data centers and said allocation of resources for one of said plurality of virtual data centers overlaid with said current usage of resources of said one of said plurality of virtual data centers;
    in response to receiving a selection of a virtual machine grouping of said plurality of virtual machine groupings in said second graph, overlaying, by said processor, resource usage of said virtual machine grouping in said third graph; and
    in response to receiving a user interaction, separating, by said processor, said aggregate health into indicators for each factor of said plurality of factors.

2. The computer-implemented method of claim 1, wherein said generating a second graph further comprises:
    generating a second graph depicting aggregate health of each of said plurality of virtual machine groupings of said plurality of said virtual data centers selected in said first graph.

3. The computer-implemented method of claim 1, wherein said generating a third graph further comprises:
    generating a third graph depicting allocation of resources for each virtual data center selected in said first graph overlaid with said current usage of resources of each of said plurality of virtual data centers selected in said first graph.

4. The computer-implemented method of claim 1, wherein said generating a third graph further comprises:
    generating a third graph depicting allocation of resources for one of said plurality of virtual data centers, current usage of said resources for one of said plurality of virtual data centers, and current usage of one of said plurality of virtual machine groupings overlaid with one another.

5. The computer-implemented method of claim 1, wherein said generating a third graph further comprises:
    generating a third graph depicting allocation of resources for one of said plurality of virtual data centers, wherein said resources comprise: CPU, memory and storage.

6. The computer-implemented method of claim 1, further comprising:
    highlighting one of said plurality of virtual machine groupings when an aggregate health of said one of said plurality of virtual machine groupings exceed a threshold aggregate health value.

7. The computer-implemented method of claim 1, further comprising:
    in response to selecting said virtual machine grouping in said second graph, displaying values of resource allocation, resource usage, health and lease length of said virtual machine grouping.

8. The computer-implemented method of claim 1, further comprising:
    in response to selecting one or more of said virtual data centers in said first graph, displaying aggregate health of each virtual machine grouping for said selected one or more virtual data centers.

9. The computer-implemented method of claim 1, further comprising:
    in response to selecting one or more of said virtual data centers in said first graph, displaying said allocation of resources and said current usage of resources for said selected one or more virtual data centers.

10. A non-transitory computer-readable storage medium having instructions embodied therein that when executed cause a computer system to perform a method for generating a graph of parameters of a virtualized computing environment, said method comprising:
    operating said virtualized computing environment, wherein said virtualized computing environment comprises a plurality of virtual data centers and a plurality of virtual machines, said plurality of virtual data centers and said plurality of virtual machines are implemented within at least one physical machine, and wherein said plurality of virtual machines comprise installed applications;
    automatically periodically accessing a plurality of parameters from a plurality of virtual machine groupings located in said plurality of virtual data centers of said virtual computing environment, wherein said plurality of parameters comprises: allocation of resources, current usage of resources, and health;
    generating a first graph depicting overall allocation of resources and overall current usage of resources for each one of said plurality of virtual data centers in said virtualized computing environment;

generating a second graph depicting aggregate health of each of said plurality of virtual machine groupings for each plurality of virtual data centers selected in said first graph;

generating a third graph depicting allocation of resources overlaid with current usage of resources for each plurality of virtual data centers selected in said first graph, wherein said first graph, said second graph and said third graph are for rendering in a single view; and displaying said first graph, said second graph, and said third graph in a single view of a display, wherein said single view provides a hierarchical view of said plurality of resources such that said first graph, said second graph and said third graph are relationally navigable;

aligning said second graph proximate to said third graph such that a user can view relationships between said aggregate health of said plurality of virtual machine groupings for one of said plurality of virtual data centers and said allocation of resources for one of said plurality of virtual data centers overlaid with said current usage of resources of said one of said plurality of virtual data centers; and in response to receiving a selection of a virtual machine grouping of said plurality of virtual machine groupings in said second graph, overlaying resource usage of said virtual machine grouping in said third graph.

11. The non-transitory computer-readable storage medium of claim 10, wherein said generating said second graph further comprises:
generating a second graph further depicting a lease length of said each of a plurality of virtual machine groupings.

12. The non-transitory computer-readable storage medium of claim 10, wherein said generating said second graph further comprises:
generating a second graph further depicting health, capacity and workload for said each of a plurality of virtual machine groupings.

13. The non-transitory computer-readable storage medium of claim 10, wherein said generating said second graph further comprises:
generating a second graph further depicting health, capacity and workload for said each of a plurality of virtual machine groupings, wherein said health, capacity and workload are separated.

14. The non-transitory computer-readable storage medium of claim 10, wherein said method further comprises:
in response to selecting one of said virtual machine groupings in said second graph, displaying values of resource allocation, resource usage, health and lease length of said one of said virtual machine groupings.

15. The non-transitory computer-readable storage medium of claim 10, wherein said aggregate health is comprised of a plurality of factors, wherein each factor of said plurality of factors is visually distinct, said method further comprising:
in response to receiving a user interaction, separating said aggregate health into indicators for each factor of said plurality of factors.

16. A computing system comprising:
a virtualized computing environment comprising a plurality of virtual data centers and a plurality of virtual machines, said plurality of virtual data centers and said plurality of virtual machines are implemented within at least one physical machine, and wherein said plurality of virtual machines comprise installed applications; and
a monitoring computer system comprising:
at least one processor; and
a non-transitory computer-readable storage medium containing instructions which when executed on the one or more data processors, cause the one or more processors to perform a method for generating a graph of parameters of a virtualized computing environment, said method comprising:
automatically periodically accessing, at a processor, a plurality of parameters from said plurality of virtual machine groupings located in a plurality of virtual data centers of said virtual computing environment, wherein said plurality of parameters comprises: allocation of resources, current usage of resources, and health;
generating, by said processor, a first graph depicting overall allocation of resources and overall current usage of resources for each one of said plurality of virtual data centers in said virtualized computing environment;
generating, by said processor, a second graph depicting aggregate health of each of said plurality of virtual machine groupings for each plurality of virtual data centers selected in said first graph, wherein said aggregate health is comprised of a plurality of factors, wherein each factor of said plurality of factors is visually distinct, and wherein a virtual machine grouping is highlighted when said aggregate health of said virtual machine grouping exceeds a threshold aggregate health value;
generating, by said processor, a third graph depicting allocation of resources overlaid with current usage of resources for each plurality of virtual data centers selected in said first graph, wherein said resources comprises: CPU, storage, and memory, wherein said first graph, said second graph and said third graph are for rendering in a single view;
displaying said first graph, said second graph, and said third graph in a single view of a display, wherein said single view provides a hierarchical view of said plurality of resources such that said first graph, said second graph and said third graph are relationally navigable;
aligning said second graph proximate to said third graph such that a user can view relationships between said aggregate health of said plurality of virtual machine groupings for one of said plurality of virtual data centers and said allocation of resources for one of said plurality of virtual data centers overlaid with said current usage of resources of said one of said plurality of virtual data centers; and
in response to receiving a user interaction, separating said aggregate health into indicators for each factor of said plurality of factors.

17. The computing system of claim 16, said method further comprising:
in response to selecting one of said virtual machine groupings in said second graph, overlaying resource usage of said one of said virtual machine groupings in said third graph.

18. The computing system of claim 16, said method further comprising:
in response to selecting one of said virtual machine groupings in said second graph, displaying values of resource allocation, resource usage, health and lease length of said one of said virtual machine groupings.

\* \* \* \* \*